Nov. 6, 1951   O. E. PETER   2,573,928
CLAMPING SYSTEM
Filed Sept. 8, 1949   2 SHEETS—SHEET 1
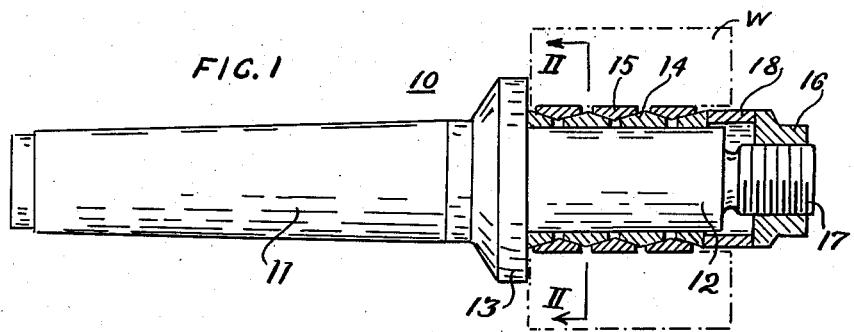
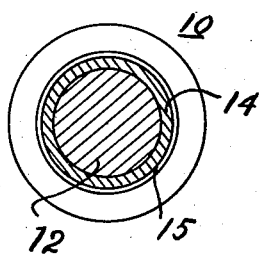
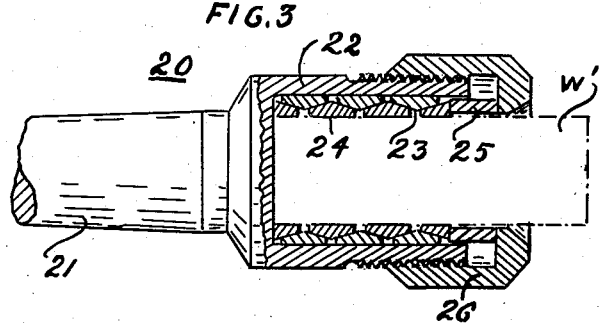
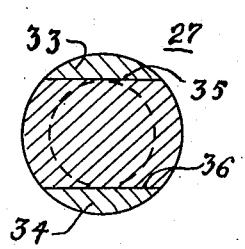
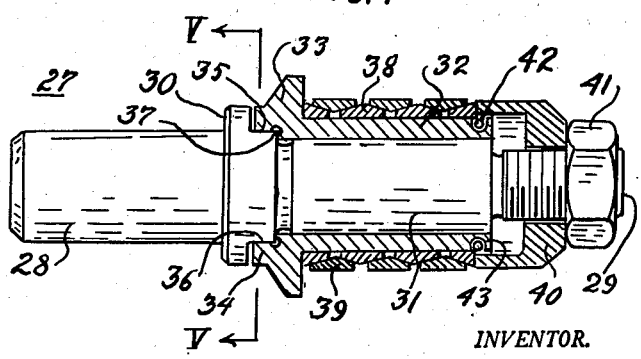
INVENTOR.
BY OSKAR E. PETER
Hoopes, Leonard & Glenn
his attorneys Nov. 6, 1951 — O. E. PETER — 2,573,928
CLAMPING SYSTEM
Filed Sept. 8, 1949 — 2 SHEETS—SHEET 2
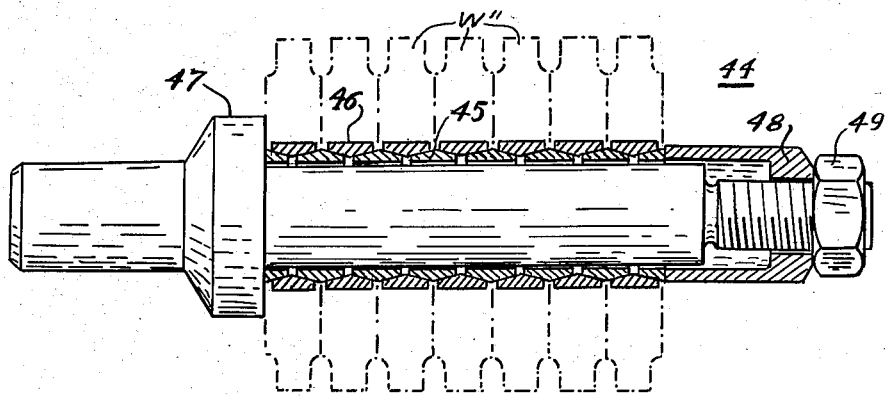
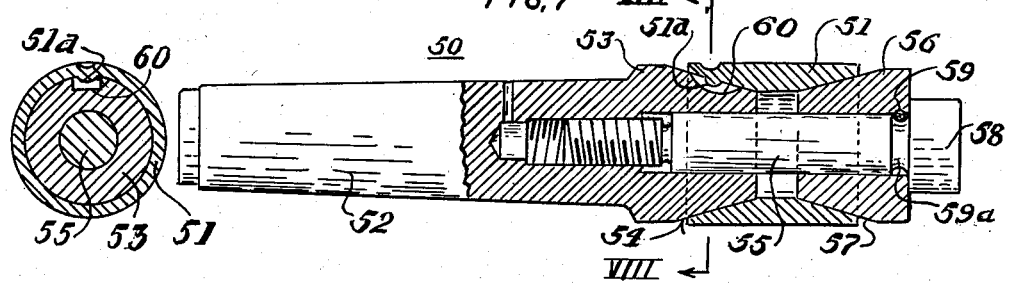
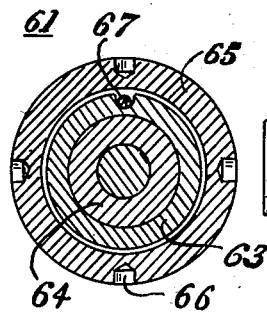
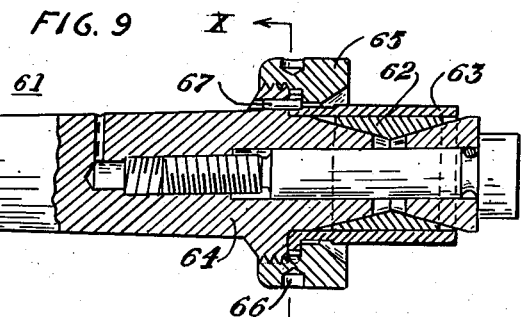
INVENTOR:
OSKAR E. PETER
BY his attorneys
Hoopes, Leonard & Glenn Patented Nov. 6, 1951

2,573,928

UNITED STATES PATENT OFFICE 2,573,928

CLAMPING SYSTEM

Oskar E. Peter, Oberkochen, Germany

Application September 8, 1949, Serial No. 114,540
In Germany May 20, 1948

8 Claims. (Cl. 279—2)

This invention relates to a clamping device, which may be used for chucking of the workpiece in machine tools and for other rotary clamping purposes. A divisional application entitled "Clamping System," Serial No. 220,376, was filed April 11, 1951.

Many different types of clamping devices are known. For the chucking of the workpiece in machine tools, for example, expanding arbors are used, such as shown in United States Patent 1,232,704, consisting of a longitudinally split sleeve, the bore of which tapers from its ends toward the intermediate portion thereof so that the sleeve is thickest about midway between its ends. Around the thickest part of the sleeve longitudinal slits, intersected by enlarged openings, are provided. Conical inner rings act to expand the sleeve and cause it to grip the workpiece. Such an expanding sleeve will not completely retain its circular shape and will deform thin-walled workpieces.

Another form of expanding mandrel is disclosed in United States Patent 2,348,819 and consists of individual chucking segments, urged together by a coiled spring. These segments form a sleeve which is expanded by cones with keys which guide the segments while the sleeve expands and grips the workpiece. The sleeve does not retain its circular shape during expansion of the segments and will deform a thin walled workpiece. This chuck has the further disadvantage of being very expensive to manufacture.

A multiple expansion mandrel is disclosed in United States Patent 1,363,310 which is adapted to be mounted between centers while it supports a workpiece to be machined. The mandrel consists of slotted bushings, which are expanded by axial movement of the conical ends of adjacent bushings. Workpieces are clamped by the expansion of spaced joints and the bores and the axes of rotation of the bushings are not positively maintained in axial alignment.

Mechanical chucks are also known, which have skewed rollers inserted between the outer chucking sleeve and an inside cone. So are hydraulic chucks, where oil under high pressure expands the chuck against the bore of the workpiece. The two latter devices both have the disadvantage of complicated structure and of very small bore tolerances.

The above mentioned drawbacks are avoided by the clamping system of my invention. I provide individual, closed outer and inner rings of spring steel which bear on each other along conical contact surfaces. Under axial load the outer rings will radially expand while the inner rings contract. Removal of the load will cause the rings to regain their original shape. Since the expanded rings are smooth and circular on their outside, the chucking does not deform thin walled workpieces or damage highly finished bores. Clamping elements of this kind are adapted not only to clamp by expansion within a workpiece but also by contraction around a workpiece, and are applicable not only to chucks but to other uses where concentric parts are to be clamped together. By increasing the number of rings the clamp can be made long enough to accommodate a number of workpieces.

I also provide means whereby the same chuck stem may be used with several interchangeable clamping sets.

In one embodiment I provide a chuck with only one outer ring having inside conical surfaces which co-act with the conical end of the chuck stem and with a conical bushing mounted on the stem. The said outer ring is turned or ground on the machine tool in which it is used in order to eliminate any eccentricity of the combination of the chuck and the machine tool. In order to maintain the concentric alignment of the ring on the chuck the ring carries a projection which registers with a corresponding depression in the chuck stem.

I provide an alternative means of eliminating eccentricity of machine tools comprising a thin, highly elastic sleeve mounted on and expansible by a chuck and finished while the chuck is rotated by the machine tool in which the chuck is used. Means are provided for locking the sleeve to the chuck to maintain the concentric alignment of the sleeve on the chuck. The sleeve is continuously circular and expands as a perfect circle when mounted around means such as a clamping ring which expands as a perfect circle.

If a workpiece is to be accurately aligned with its side surface perpendicular to its axis of rotation I provide an interchangeable stop ring, which would be machined at the same time and in the same way as the elastic sleeve or clamping rings so that they are exactly true to each other.

Other details, objects and advantages of my invention will become apparent from the following description and in the accompanying drawings. I have shown in the drawings, for purposes of illustration only, the following preferred embodiments of my invention, in which:

Figure 1 shows an overhanging chuck with clamping rings for inside chucking;

Figure 2 shows a section taken along the line II—II in Figure 1;

Figure 3 shows an overhanging chuck having the same clamping rings as in Figure 1, but mounted for outside chucking;

Figure 4 shows a two-center chuck with interchangeable bushings and clamping rings for workpieces of different bores;

Figure 5 is a section along the line V—V in Figure 4;

Figure 6 is a two-center chuck with multiple clamping rings shown in relaxed state with exaggerated spacing from the chuck body;

Figure 7 is an overhanging chuck with a single clamping ring;

Figure 8 shows a section taken along the line VIII—VIII in Figure 7, and partially broken away;

Figure 9 is a chuck similar to that in Figure 8 but having a clamping sleeve and stop ring; and Figure 10 shows a section taken along the line X—X in Figure 9.

Referring now more particularly to the drawings and considering first the form of structure shown in Figures 1 and 2, there is provided a chuck 10 having a shank 11 adapted to be held and driven by a machine tool spindle (not shown). The shank 11 has an integral cylindrical extension 12 and intermediate integral shoulder 13. The extension 12 is surrounded by a series of solid inner rings 14 each having cylindrical inner surfaces and conical outer surfaces of diminishing radius toward each adjacent ring of the series. A second series of solid rings 15 extend around the rings 14 with each of the rings 15 having cylindrical outer surfaces and conical inner surfaces slidably engaging adjacent conical surfaces of a pair of the rings 14. The rings 14 and 15 are made of spring steel and in relaxed condition the rings 14 are spaced axially from each other and are in loose engagement with the extension 12 and the outer rings 15. When the rings 14 are axially compressed they wedge against the rings 15 with the result that the rings 15 are in tension and are expanded radially and circumferentially while the rings 14 are in compression and are contracted radially and circumferentially. When the axial compression is relieved the springs 14 and 15 resume their initial form and wedge apart to their initial alignment. In order to apply and relieve axial compression on the rings 14 a nut 16 is screwed on a projection 17 of the extension 12 and a spacer sleeve 18 extends between the nut 16 and the nearest of the rings 14, with part of the sleeve 18 slidably supported by one end of the extension 12. When the nut 16 is screwed toward the shoulder 13 the rings 14 are squeezed between the shoulder 13 and the sleeve 18 and continued turning of the nut 16 causes the rings 14 to contract and lock frictionally against the extension 12 and the rings 15 while the rings 15 are expanded to lock frictionally against the bore of a workpiece W. The bore of the workpiece should be between the outer diameter of the rings 15 when relaxed and the outer diameter of the rings 15 when expanded so that the workpiece readily slips over the rings 15 when the nut 16 is screwed away from the rings 14 and is locked to the chuck 10 when the nut 16 is screwed sufficiently toward the rings 14.

In Figure 3 a chuck 20 is shown which is adapted to surround and contract against a workpiece. The body of the chuck 20 comprises a shank 21 adapted to be held and driven by a machine tool spindle and an integral extension 22 in the form of a hollow cylinder. Enclosed with the extension 22 are a series of outer rings 23 and a series of inner rings 24 which are identical in shape and arrangement with the rings 14 and 15 shown in Figure 1. The inner rings 24 are axially compressible between the body of the chuck 20 and a spacer sleeve 25 which is axially movable by a cap 26 screwed to the cylindrical extension 22. When the cap 26 is screwed in the direction of the shank 21 the inner rings 24 are compressed axially and wedge against the outer rings 23 so that the outer rings 23 expand and lock against the extension 22 and the inner rings 24 contract and lock around a suitable workpiece W'. When the cap 26 is screwed in the opposite direction the workpiece W' is released and the rings 23 and 24 resume their initial form and alignment.

In Figures 4 and 5 a chuck 27 is shown which has interchangeable elements for inside gripping of workpieces of different bores. The chuck 27 has a body having at one end a shank 28 adapted to be held and driven by a machine tool spindle and at the other end an extension 29 adapted to be supported during rotation by a centering device mounted on the machine tool bed. Between the shank 28 and the extension 29 the chuck body comprises a shoulder 30 and an intermediate cylindrical portion 31. A bushing 32 fits around the body portion 31 and spaced tongues 33 and 34 extend from the bushing 32 to overlie parallel flat surfaces 35 and 36 machined in the shoulder 30 of the chuck body. The bushing 32 is axially slidable on and off the chuck body, but is locked against rotation relative to the chuck body by interengagement of the tongues 33 and 34 and surfaces 35 and 36. Axial movement of the bushing 32 toward the shank 28 is limited by engagement of the bushing 32 with a portion 37 of the shoulder 30. A series of inner rings 38 fit around the bushing 32 and a series of outer rings 39 extend around and between the rings 38, these rings being identical in shape and arrangement with the rings 14 and 15 shown in Figure 1. The inner rings 38 are held between a shoulder of the bushing 32 and a cap 40 slidably mounted around the extension 29. A nut 41 screwed on the extension 29 engages the cap 40 and is adapted to force it toward the bushing shoulder 39 in order to compress the inner rings 38 axially, whereby the rings 38 and 39 interlock and wedge so that the inner rings 38 contract and lock around the bushing 32 while the outer rings expand and lock inside the bore of a suitable workpiece (not shown). When the nut 41 is screwed away from the shoulders 30 and 33 the rings 38 and 39 resume their initial shape and alignment and the workpiece is released. Continued turning of the nut 41 removes it from the extension 29. The cap 40 may then be removed from the extension 29, whereupon an annular coil spring 42 is uncovered and partially rises from an annular groove 43 in the body portion 32 to hold the rings 38 and 39 from slipping off their mounting until the spring is depressed or removed to release the rings. The bushing 32 may be slid axially from the body of the chuck 27 and a different size bushing with different sized rings may be substituted in order to handle workpieces of different bores on the same chuck body.

Figure 6 shows a chuck 44 which is generally similar to the chuck 10 shown in Figure 1 except that it is adapted to be supported at both ends and it has a greater number of inner rings 45 and outer rings 46. The locking operation of the rings 45 and 46 is the same as that of the rings 14 and 15 shown in Figure 1 but instead of a single workpiece W a number of separate milling cutters W'' are shown, each cutter being mounted on a single one of the outer rings 46. While the inner rings 45 are being compressed between a shoulder 47 and a sleeve 48 by means of a nut 49 the outer rings 46 slide laterally against the cutters W'' until the rings 46 lock against the cutters W'', at which time the rings 45 lock against the body of the chuck 44. The cutters W'' are thereby locked to the chuck and are held against rotational movement relative to each other by the frictional engagement of the outer springs 46 against the inner springs 45.

Figures 7 and 8 show a chuck 50 with a single solid ring 51 of spring steel and adapted to be locked against the bore of a workpiece (not shown). The body of the chuck 50 comprises a shank 52 adapted to be held and driven by a machine tool spindle and a hollow extension 53 with conical outer surfaces 54. One end of a stem 55 is screwed into the extension 53 and the other end of the stem 55 supports a bushing 56 with conical outer surfaces 57. The ring 51 has inner conical surfaces which wedge against the conical surfaces 54 and 57, and the stem 55 has an enlarged end portion 58 which engages the collar 56 and thereby draws the surfaces 54 and 57 together when the stem 55 is screwed into the body extension 53. Bringing the surfaces 54 and 57 together by turning the stem 55 expands the ring 51 to lock it against the bore of a suitable workpiece. Turning the stem 55 in the other direction releases the lateral compression on the spring 51 so that it can resume its initial form and release the workpiece. A straight pin 59 through the bushing 57 engages an annular groove 59a in the stem 55 and serves to pull the bushing 57 positively out of engagement with the ring 51 when the stem 55 is screwed away from the extension 53, thereby facilitating the resilient contraction of the ring 51. The outer surface of the ring 51 is cylindrical and is preferably turned down while the chuck is driven by the machine tool on which it is used so that the outer surface of the ring 51 will be accurately concentric with the axis of rotation of the chuck on the particular machine. The accurately concentric alignment of the ring 51 on the chuck body is maintained by deforming a portion 51a of the ring 51 into a notch 60 in the extension 53 of the chuck body (see Figure 8).

Figures 9 and 10 show a chuck 61 similar to the chuck 50 shown in Figures 7 and 8 except that its expansible ring 62 is surrounded by a thin sleeve 63 which is locked to the chuck body 64 by a stop ring 65 screwed around the chuck body 64. Sockets 66 in the stop ring 65 aid in screwing it into place and a pin 67 extends through slots in a flanged portion of the chuck body 64 and through a flanged portion of the sleeve 63 to lock the sleeve 63 against rotation relative to the chuck body 64. The sleeve 63 is of spring steel and it expands with the ring 62 and locks between the ring 62 and the bore of a suitable workpiece. The sleeve 63 is interchangeable and both the ring 62 and sleeve 63 are continuously circular so that the sleeve 63 remains a substantially perfect circle as it is expanded by the ring 62. The sleeve is preferably turned down while it is on the chuck in the machine tool in which the chuck is used, so that the outer surface of the sleeve 63 will be accurately concentric with the axis of rotation of the chuck on the particular machine. The side of the stop ring 65 which bears against the side of a workpiece on the chuck is also preferably finished while the chuck is rotated by the machine tool in which the chuck is used, so that the stop ring 65 will aid in supporting the workpiece in true alignment relative to the axis of rotation of the chuck on the particular machine. In this way the chuck is adjusted for work of the highest accuracy.

While I have shown and described certain present preferred embodiments of my invention and have illustrated certain present preferred methods of practicing the same it will be recognized that changes in the details and arrangements may be made without departing from the spirit of the invention or the scope of the following claims.

I claim:

1. A rotatable clamping device comprising a group of continuously circular resilient rings including a series of inner rings with conical outer surfaces and a series of outer rings with conical inner surfaces bearing against the said conical surfaces of the inner rings, the rings in each series being normally spaced from each other, and means engageable with opposite ends of the group of rings and relatively movable to engage and laterally compress the group of rings, whereby the conical surfaces of the two series of rings are wedged together so that the outer series of rings expand to clamp an outer concentric piece while the inner series of rings contract to clamp an inner concentric piece, and said means being oppositely movable to relieve the lateral compression on the rings so that the rings may resiliently resume their initial form and alignment to unclamp the concentric pieces.

2. A chuck with replaceable elements for clamping workpiece bores of different diameters, comprising an elongated body with a drivable shank at one end and an intermediate projecting shoulder, a bushing around the body abutting said shoulder and laterally slidable off the end of the body away from the shank, means locking the bushing against rotation relative to the body, a shoulder around the bushing adjacent its end abutting against the body shoulder, a group of continuously circular resilient rings around the bushing, said group comprising a series of inner rings with conical outer surfaces and a series of outer rings with conical inner surfaces bearing against the said conical surfaces of the inner rings, the rings in each series being normally spaced from each other and said group of rings being retained by the shoulder at one end of the bushing and laterally slidable off the other end of the bushing, and annular means screwed around the body and rotatable to move laterally against the group of rings in the direction of the bushing shoulder, thereby wedging the rings together to clamp the inner rings radially against the bushing and the outer rings radially against the bore of a workpiece, said annular means being counter-rotatable to permit the rings to resume their initial form and alignment and being further counter-rotatable to remove the annular means from the body and thus to permit removal and replacement of the rings or the bushing or both.

3. A chuck according to claim 2 in which the bushing has an end over which the group of rings may slip and a groove around said end with a spring in said groove, said spring being adapted to be depressed within the groove to permit the group of rings to slip off the bushing and when not depressed to rise partially out of the groove to engage and keep the group of rings on the bushing.

4. A rotatable clamping device comprising a fully circular resilient clamping ring having a clamping surface extending around one portion of the ring and oppositely tapering conical surfaces extending around the other side of the ring, a pair of members each having a conical surface tapering toward the other member and engaging a conical surface of the clamping ring, and means to force said conical members toward each other, whereby said means are operable to wedge the conical members against the clamping ring to force its clamping surface radially against a concentric surface of a piece desired to be clamped to the device.

5. A rotatable clamping device comprising a fully circular resilient clamping ring having a clamping surface around the outside of the ring and oppositely tapering conical surfaces extending around the inside of the ring, a pair of members each having a conical surface tapering toward the other member and engaging a conical surface of the clamping ring, a stem extending through the ring and screw-threaded into one of said members, said stem being rotatably slidable against the other of said members but in doubly and oppositely abutting relationship with the latter member to move it laterally with the stem when the stem is screwed into and out of the former member, whereby said structure is rotatable to draw the said members together against the ring in order to expand the ring radially against a concentric surface of a piece desired to be clamped to the ring and to draw the said members apart in order to release the ring from the clamped piece.

6. A rotatable clamping device in accordance with claim 5 in which the member into which the stem is threaded has an axially elongated notch in its conical surface and the ring has a projection extending into and axially slidable along said notch, whereby a concentric alignment of the ring with the notched member is maintained.

7. A rotary clamping device comprising an expandable continuously circular resilient ring and a thin-walled expandable continuously circular resilient sleeve around the outside of the ring, said sleeve being slidable on the ring when the ring and sleeve are not expanded, and said sleeve being adapted to expand with the ring and to clamp firmly between the ring and the bore of a piece desired to be clamped around the ring.

8. A chuck rotatable by a machine tool comprising an expandable continuously circular resilient ring having oppositely tapered inner conical surfaces, a pair of members each with a conical surface engaging one of the conical surfaces of the ring, means to move said members relative to each other in order to expand and contract the ring radially, a thin-walled expandable continuously circular sleeve around the ring adapted to be expanded by the ring against the bore of a piece desired to be clamped around the ring, and a stop ring fastening an end of the sleeve to one of said members, said stop ring having a surface overhanging and extending around a portion of the sleeve over the ring and extending perpendicular to the axis of rotation of the clamping device in the machine tool, and said sleeve having an outer clamping surface concentric with said axis of rotation, whereby the chuck supports a piece in alignment with the axis of rotation of the chuck on its machine tool.

OSKAR E. PETER.

REFERENCES CITED

The following references are of record in the file of this patent:

UNITED STATES PATENTS

| Number | Name | Date |
| --- | --- | --- |
| 1,433,590 | Ziegler | Oct. 31, 1922 |
| 2,348,819 | Johnson | May 16, 1944 |
| 2,348,908 | Jacobs | May 16, 1944 |
| 2,387,214 | Corey | Oct. 16, 1945 |